3,384,616
THERMALLY STABLE POLYAMIDES CONTAINING COPPER 2,2'-DIHYDROXY-DIPHENYLSULFIDES OR MIXTURES OF COPPER SALTS WITH 2,2'-DI-HYDROXY-DIPHENYLSULFIDES
Karl-Heinz Heller, Krefeld, Peter Popper and Joachim Nentwig, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Continuation of application Ser. No. 398,395, Sept. 22, 1964. This application Jan. 24, 1967, Ser. No. 611,475
Claims priority, application Germany, Sept. 28, 1963, F 40,870
6 Claims. (Cl. 260—45.75)

ABSTRACT OF THE DISCLOSURE

Thermal stabilization of polyamides by the incorporation therein of copper salts of

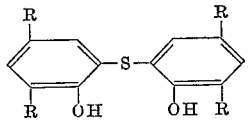

wherein R is at least one member selected from the group consisting of hydrogen, halogen, cycloalkyl, and alkyl having about 1 to 12 carbon atoms; and mixtures of copper chlorides, sulfates, nitrates or acetates with compounds of the formula

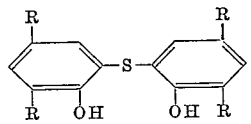

wherein R is at least one member selected from the group consisting of hydrogen, halogen, cycloalkyl, and alkyl having about 1 to 12 carbon atoms.

---

This invention relates to polyamides of improved thermal stability. The invention more particularly relates to polyamides containing additives which will prevent or reduce a decrease in mechanical properties such as tensile strength upon exposure to heat in the presence of oxygen.

Structures of linear thermoplastic polyamides of high molecular weight, such as poly-ε-caprolactam and poly-hexamethyleneadipamide and polycondensation products of higher cyclic lactams suffer an impairment of their mechanical properties when exposed to heat in the presence of air. In particular, the tensile strength of molded parts made of such polyamides is substantially reduced.

It is in the prior art to stabilize polyamides against the above-named damage by incorporating into them, before, during or after manufacture, small amounts of copper compounds, such as copper salts of organic carboxylic acids.

It is furthermore known that the stabilizing effect of such copper compounds can be still further improved by additionally adding still larger quantities—generally up to 4 weight-percent, of antioxidants, such as organic amino compounds and substituted phenols. The large quantities of the additives, however, affect the characteristics of the polyamides, especially their tensile strength and their flow characteristics, to an undesirable extent, and satisfactory thermal stabilization cannot be achieved in this manner. Furthermore, the use of phenols is rather objectionable physiologically.

One object of this invention is to thermally stabilize polyamides without the above disadvantages. This and further objects will become apparent from the following description:

It has now been found that these disadvantages can be avoided and polyamides of outstanding thermal stability can be obtained by adding to the polyamides compounds of copper with 2,2'-dihydroxydiphenylsulfides or mixtures of copper salts with 2,2'-dihydroxydiphenyl sulfides.

The compounds of copper with 2,2'-dihydroxydiphenyl-sulfides which may be used in the present invention are either salts made from equimolar quantities of copper and a thio-bis-phenol, or complex salts made from copper and a thio-bis-phenol in a 1:2 molar ratio. These salts or complex salts can be obtained advantageously, for example by dissolving the thio-bis-phenol in appropriate quantities in inert organic water-miscible solvents such as alcohols, ketones, or the like, and adding to these solutions, solutions or suspensions of copper salts of inorganic or organic acids such as copper chloride, copper sulfate, copper nitrate, copper acetate, copper propionate, etc., in the said solvents, or adding to the said solutions aqueous solutions of these salts, and adding water, if desired, to the mixture thus obtained. By the appropriate selection of the molar ratio between the thio-bis-phenol and the copper compound salt mixtures can also be made in which the molar ratio of thio-bis-phenol to the copper compound amounts to between approximately 2:1 and approximately 1:1. Such salt mixtures are also outstandingly suited for the thermal stabilization of the polyamides.

Instead of the said compounds of copper with 2,2'-dihydroxydiphenylsulfides, appropriate mixtures of copper salts and 2,2'-dihydroxydiphenylsulfides can also be added to the polyamides if desired. It is expedient in this case to use those copper salts which are also suitable for manufacturing the above-named copper compounds of 2,2'-dihydroxydiphenylsulfides as for example the chlorides, sulfates, nitrates, acetates, propionates, and the like. These mixtures also give an outstanding stabilizing effect.

The starting 2,2'-dihydroxydiphenylsulfides (thio-bis-phenols) constitute compounds having 2 phenol groups linked through a sulfur linkage with each phenol group containing a hydroxy substitute in the 2 position with respect to the sulfur linkage. The other positions of the phenol radical may be unsubstituted or substituted with various substituents as, for example, alkyl groups, cycloalkyl groups, halogen atoms, such as chlorine atoms and the like. Each of the phenol radicals may contain from 1 to 4 such substituents. The thio-bisphenols have the general formula

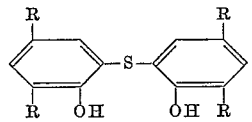

wherein R stands for hydrogen, halogen, an alkyl group having 1 to 12 C-atoms, and a cycloalkyl group. Preferably R is hydrogen, chlorine, methyl, isopropyl, 1,1,3,3-tetramethylbutyl, tert. butyl, cyclohexyl and isooctyl.

Examples of these thio-bis-phenols which can be used for the process of the invention include 2,2'-dihydroxydiphenylsulfide,
2,2'-dihydroxy-5,5'-dimethyldiphenylsulfide,
2,2'-dihydroxy-5,5'-dicyclohexyldiphenylsulfide,
2,2'-dihydroxy-5,5'-diisopropyldiphenylsulfide,
2,2'-dihydroxy-5,5'-dichlorodiphenylsulfide,
2,2'-dihydroxy-3,3'-dimethyl-5,5'-di-tert.butyldiphenyl-sulfide,
2,2'-dihydroxy-3,3'-di-tert.butyl-5,5'-dimethyldiphenyl-sulfide, 2,2'-dihydroxy-3,3',5,5'-tetramethyldiphenylsulfide, and 2,2'-dihydroxy-3,3,5,5'-tetrachlorodiphenylsulfide.

An especially good thermal stabilization is achieved in many cases by the use of 2,2'-dihydroxy-5,5'-diisooctyldiphenylsulfides, e.g., 2,2'-dihydroxy-5,5'-di-(1,1,3,3-tetramethyl-butyl)-phenylsulfide.

Surprisingly, even when extremely small amounts of the compounds of the invention are added, an outstanding thermal stabilization of the polyamides is achieved. For example, good results are achieved with the addition of as little as 0.01 weight percent, and preferably of about 0.1 to about 0.3 weight percent, to the polyamide. The addition of still greater amounts, as for example, above 0.5% is also possible, although in general no substantial improvement of the stabilizing effect is achieved, and hence it is recommendable only in special cases.

The copper compounds may be prepared by dissolving the thio-bis-phenols in an inert organic solvent which is miscible with water and adding to this solution a solution or suspension of a copper salt of an inorganic or organic acid.

The following example shows the procedure: 10.94 g. (0.052 mol) of copper acetate/1 $H_2O$ are dissolved in 400 ml. of methanol. To this solution is added a solution of 24.6 g. (0.1 mol) of 2,2'-dihydroxy-5,5'-dimethyl-sulfide in 60 ml. methanol. The brown-colored precipitate is separated. Yield: 24.2 g. of a complex salt from 2 mol of 2,2'-dihydroxy-5,5'-dimethyl-diphenylsulfide and 1 mol of copper (vacuum dried at 70° C.).

The linear polyamides were prepared by polymerizing or condensation of amino carboxylic acids, lactames or equivalent amounts of a dicarboxylic acid and a diamine.

Suitable compounds are aminoundecanic acid, p-aminobenzoic acids, α-pyyrolidone, α-piperidone, ε-caprolactame, ω-oenanthlatame, ω-capryllactame, ω-lauryllactame. The following dicarboxylic acids may be used: succinic acid, glutaric acid, adipic acid, pimelic acid, sebacinic acid, suberic acid, azelaic acid, isophthalic acid, terephthalic acid. In accordance with these carboxylic acids the following diamines may be used: ethylenediamine, tetramethylenediamine, hexamethylenediamine, octamethylenediamine, dekamethylenediamine, m-xylylenediamine, p-xylylenediamine, 4,4'-diaminodicyclohexylmethane, piperazine, toluylendiamine-(2,4), diamino-diphenylmethane-(4,4'). The molecular weight of the polyamides is in the range of between 5000 and 50,000, preferably between 10,000 and 25,000.

According to the invention, the copper compounds or mixtures can be added to the polyamides before, during or after the polycondensation. It is especially expedient in general to mix the polyamide in granulated from uniformly with the copper compound in a mixing drum, and then to fuse the mixture in an extruding machine, for example, and process it into granules or make it into formed pieces. The mixing of the polyamide granules with the copper compounds can, if desired, be performed together with the admixture of other conventional additives, such as pigments, fillers, glass fibers, dyes, lubricants, and the like.

Example 1

4 kg. of poly-ε-caprolactam granules with a relative viscosity of 2.8 (measured in a 1% metacresol solution at 25° on a Ubbelhode viscosimeter) are mixed for 2 hours in a mixing drum with 4 g. of the complex compound composed of 2 mols of 2,2'-dihydroxy-5,5'-di-(1,1,3,3-tetramethyl-butyl)-phenylsulfide and one mol of copper, and then fused in an extruding machine and formed into granules. The granules obtained are molded on an injection molding machine into standard sticks (dimensions 50 x 6 x 4 mm.) according to standard Deutsche Industrie-Norm 53453 (which means: German Industrial Standards).

The standard sticks thus obtained are stored in a drying cabinet with air circulating at 150°, in the presence of air nitrogen, together with standard sticks manufactured in like manner, but without the addition of a stabilizer. While the standard sticks stabilized according to the invention proved to be still unbreakable when tested for impact strength in a swinging type impact strength tester, i.e., were not shattered in the test, after being kept for 700 hours in the drying cabinet, the specimens made of unstabilized polyamide were embrittled after 24 hours to such an extent that they shattered without exception in the test.

Comparable results were obtained when using the polyamide from adipic acid and hexamethylenediamine.

Example 2

Example 1 is repeated using, however, in place of the complex compound (a) Salts of copper and the following, thio-bis-phenols in equimolecular amounts; 2,2'-dihydroxydiphenylsulfide, 2,2' - dihydroxy-5,5'-dicyclohexyldiphenylsulfide, 2,2'-dihydroxy-5,5'-dimethyldiphenylsulfide, 2,2'-dihydroxy-5,5'-diisopropyldiphenylsulfide, 2,2' - dihydroxy-5,5'-dichlorodiphenylsulfide, 2,2' - dihydroxy-3,3'-dimethyl-5,5'-di-tert.butyl-diphenylsulfide, 2,2' - dihydroxy-3,3'-di-tert.butyl-5,5'-dimethyldiphenylsulfide, 2,2' - dihydroxy-3,3',5,5'-tetramethyldiphenylsulfide and 2,2'-dihydroxy-3,3',5,5'-tetrachlorodiphenylsulfide.

(b) Complex salts of copper and these thio-bis-phenols containing copper and the thio-bis-phenol in a molar ratio of 1:2.

(c) Mixtures of copper chloride, copper sulfate, copper nitrate, copper acetate and copper propionate with each of these thio-bis-phenols.

In each case results comparable to those obtained in Example 1 are obtained.

While the invention has been described in detail with reference to certain specific embodiments, various changes and modifications which fall within the spirit of the invention and scope of the appended claims will become apparent to the skilled artisan.

What is claimed is:

1. A polyamide containing a thermally stabilizing amount of about 0.01 to 0.5 weight percent of a material selected from the group consisting of copper salts of

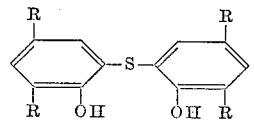

wherein R is at least one member selected from the group consisting of hydrogen, halogen, cycloalkyl, and alkyl having about 1 to 12 carbon atoms; and mixtures of copper salts selected from the group consisting of chlorides, sulfates, nitrates and acetates and

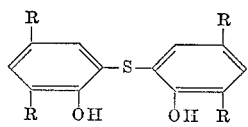

wherein R is at least one member selected from the group consisting of hydrogen, halogen, cycloalkyl, and alkyl having about 1 to 12 carbon atoms wherein the molar proportion of copper to thio-bis-phenol is about 1:1 to 1:2.

2. A polyamide according to claim 1, in which said group member is present in an amount of about 0.05 to 0.3 weight percent.

3. A polyamide according to claim 2, in which said group member is a copper salt of a 2,2'-dihydroxy-5,5'-diisooctyldiphenylsulfide.

4. A linear thermoplastic polyamide selected from the group consisting of poly-ε-caprolactam and polyhexamethylenediadipamide containing about 0.05 to 0.5 weight percent of a thermal stabilizer selected from the group consisting of copper salts of

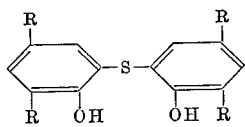

wherein R is at least one member selected from the group consisting of hydrogen, halogen, cycloalkyl, and alkyl having about 1 to 12 carbon atoms; and mixtures of copper salts selected from the group consisting of chlorides, sulfates, nitrates and acetates and

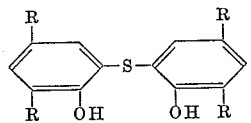

wherein R is at least one member selected from the group consisting of hydrogen, halogen, cycloalkyl, and alkyl having about 1 to 12 carbon atoms wherein the molar proportion of copper to thio-bis-phenol is about 1:1 to 1:2.

5. A linear thermoplastic poly-ε-caprolactam containing about 0.05 to 0.3 weight percent of a copper salt of a 2,2′-dihydroxy-5,5′-diisooctyldiphenylsulfide.

6. Poly-ε-caprolactam according to claim 5, in which said copper salt is a copper salt of 2,2′-dihydroxy-5,5′-di-(1,1,3,3-tetramethyl-butyl)-phenylsulfide.

References Cited
UNITED STATES PATENTS

| | | | |
|---|---|---|---|
| 2,705,227 | 3/1955 | Stamatoff | 260—45.7 |
| 3,086,960 | 4/1963 | Bletso | 260—45.95 |

FOREIGN PATENTS 1,337,938    1963    France.

DONALD E. CZAJA, *Primary Examiner.*
V. P. HOKE, *Assistant Examiner.*